(12) United States Patent
Yoshida

(10) Patent No.: US 7,228,007 B2
(45) Date of Patent: Jun. 5, 2007

(54) RESOLUTION CORRECTION APPARATUS, RESOLUTION CORRECTION PROGRAM, AND COMPUTER-READABLE RECORDING MEDIUM HAVING SAME PROGRAM RECORDED THEREON

(75) Inventor: Takuji Yoshida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 774 days.

(21) Appl. No.: 10/314,218

(22) Filed: Dec. 9, 2002

(65) Prior Publication Data

US 2003/0122938 A1  Jul. 3, 2003

(30) Foreign Application Priority Data

Dec. 27, 2001  (JP) ............................... 2001-397509

(51) Int. Cl.
*G06K 9/32* (2006.01)

(52) U.S. Cl. ...................... 382/298; 382/274; 382/275; 382/299; 358/1.2; 358/3.26; 358/3.27

(58) Field of Classification Search ................ 382/266, 382/269, 274, 275, 299, 298, 260; 358/1.2, 358/3.26, 3.27, 463
See application file for complete search history.

(56) References Cited

U.S. PATENT DOCUMENTS

| | | | |
|---|---|---|---|
| 4,694,328 A | | 9/1987 | LoCicero et al. |
| 5,499,057 A | * | 3/1996 | Kondo et al. ................ 348/607 |
| 5,576,811 A | * | 11/1996 | Kobayashi et al. ........... 399/60 |
| 5,687,297 A | * | 11/1997 | Coonan et al. ............... 358/1.2 |
| 5,717,793 A | * | 2/1998 | Ushida et al. ............... 382/298 |
| 5,838,371 A | * | 11/1998 | Hirose et al. ............ 348/240.2 |
| 5,841,899 A | * | 11/1998 | Ide et al. ..................... 382/168 |
| 5,896,489 A | * | 4/1999 | Wada .......................... 358/1.2 |
| 5,901,242 A | * | 5/1999 | Crane et al. ................. 382/166 |
| 5,937,108 A | * | 8/1999 | Harris ......................... 382/298 |
| 6,229,578 B1 | * | 5/2001 | Acharya et al. ............. 348/607 |
| 6,266,102 B1 | * | 7/2001 | Azuma et al. .............. 348/671 |
| 6,313,883 B1 | | 11/2001 | Thaler |
| 6,476,824 B1 | * | 11/2002 | Suzuki et al. ............... 345/690 |
| 6,493,878 B1 | * | 12/2002 | Kassatly ..................... 725/144 |
| 6,496,594 B1 | * | 12/2002 | Prokoski ..................... 382/118 |
| 6,535,650 B1 | * | 3/2003 | Poulo et al. ................. 382/284 |
| 6,646,760 B1 | * | 11/2003 | Hanihara ..................... 358/1.9 |
| 6,714,692 B1 | * | 3/2004 | Kim et al. ................... 382/299 |
| 6,785,814 B1 | * | 8/2004 | Usami et al. ................ 713/176 |

FOREIGN PATENT DOCUMENTS

| | | |
|---|---|---|
| JP | 5-22634 A | 1/1993 |
| JP | 6-350877 A | 12/1994 |
| JP | 17-074987 A | 3/1995 |
| JP | 7-245718 A | 9/1995 |
| JP | 2000-4380 A | 1/2000 |

* cited by examiner

*Primary Examiner*—Yosef Kassa
(74) *Attorney, Agent, or Firm*—Birch, Stewart, Kolasch & Birch, LLP

(57) ABSTRACT

A resolution correction apparatus of the present invention includes: an outline signal generator for generating an outline signal, which represents an outline of an image, based on an image signal; an outline correction signal generator for generating an outline correction signal to emphasize the outline of the image, based on the outline signal generated by the outline signal generator and an amount of correction which is increased along radial directions from the center of the image to peripheral portions thereof; and an outline correction signal adder for adding the outline correction signal generated by the outline correction signal generator to the image signal.

5 Claims, 10 Drawing Sheets

RESOLUTION CORRECTION APPARATUS, RESOLUTION CORRECTION PROGRAM, AND COMPUTER-READABLE RECORDING MEDIUM HAVING SAME PROGRAM RECORDED THEREON

This nonprovisional application claims priority under 35 U.S.C. § 119(a) on Patent Application No. 2001-397509 filed in JAPAN on Dec. 27, 2001, which is herein incorporated by reference.

BACKGROUND OF THE INVENTION

1. Field of the Invention

The present invention relates to a resolution correction apparatus and program for correcting resolution of an image captured by a camera for use in a portable device, an electronic still camera, or the like, and to a computer-readable recording medium having the same program recorded thereon.

2. Description of the Related Art

Cameras for use in small-sized portable devices, electronic still cameras, etc., are becoming smaller in size. A lens provided in such a camera has a lens aberration unique thereto and is characterized in that resolution of an image captured by a camera including such a lens becomes lower at peripheral portions of the image than at a central portion thereof. The image captured by the camera having such a lens is unclear since the resolution of the image is lower at the peripheral portions of the image than at its central portion corresponding to the lens center.

When the number of lenses are increased in order to prevent resolution from being degraded at the peripheral portions of the image, a size of a lens, and weight and cost of a camera employing the lenses are increased. There are great demands for reduction in production costs and size of an optical system such as a lens, and thus it is not easy to increase the number of lenses used in a camera, such as a camera for use in a portable device, an electronic still camera, or the like.

Japanese Laid-Open Patent Publication No. 7-74987 discloses a structure for preventing a reduction in resolution at the peripheral portions of an image without increasing the number of lenses. FIG. 10 is a block diagram of a conventional resolution correction apparatus 9 disclosed in this publication. The resolution correction apparatus 9 has an input terminal T to which an image signal representing an image captured by a camera is input. The image signal input to the input terminal T is supplied to each of a correction addition section 91, an outline correction signal generation section 89, and a correction amount adjustment section 93. The outline correction signal generation section 89 has a horizontal correction signal generator 90. The horizontal correction signal generator 90 generates a horizontal outline correction signal based on the image signal input to the input terminal T and outputs the generated horizontal outline signal to a horizontal variable amplifier 94 provided in the correction amount adjustment section 93.

The correction amount adjustment section 93 also includes a horizontal parabolic wave generator 95 which receives the image signal input to the input terminal T and outputs a horizontal parabolic wave signal in synchronization with the image signal to the horizontal variable amplifier 94. The horizontal variable amplifier 94 nonlinearly adjust the horizontal outline correction signal generated by the horizontal correction signal generator 90 based on the horizontal parabolic wave signal generated by the horizontal parabolic wave generator 95, such that correction amount becomes great at the left and right edge portions of the image represented by the image signal.

An output of the horizontal variable amplifier 94 is supplied to a horizontal adder 92 provided in the correction addition section 91. The horizontal adder 92 delays the image signal input to the input terminal T so as to be in timing with the horizontal outline correction signal adjusted by the horizontal variable amplifier 94 and adds the delayed image signal to the horizontal outline correction signal. This addition emphasizes the horizontal outline of the image represented by the image signal.

An output of the horizontal adder 92 is supplied to a vertical correction signal generator 96 provided in the outline correction signal generation section 89 and a vertical adder 97 provided in the correction addition section 91. The vertical correction signal generator 96 generates a vertical outline correction signal based on the image signal representing the image having horizontal outline emphasized by the horizontal adder 92.

The correction amount adjustment section 93 also includes a vertical parabolic wave generator 99 and a vertical variable amplifier 98. The vertical parabolic wave generator 99 outputs a vertical parabolic wave signal in synchronization with the image signal input to the input terminal T to the vertical variable amplifier 98. The vertical variable amplifier 98 nonlinearly adjusts the vertical outline correction signal generated by the vertical correction signal generator 96 based on the vertical parabolic wave signal output by the vertical parabolic wave generator 99, such that the correction amount becomes great at the upper and lower edge portions of the image represented by the image signal.

An output of the vertical variable amplifier 98 is supplied to a vertical adder 97 provided in the correction addition section 91. The vertical adder 97 delays the image signal representing the image having the horizontal outline emphasized by the horizontal adder 92 so as to be in timing with the vertical outline correction signal adjusted by the vertical variable amplifier 98 and adds the delayed image signal to the vertical outline correction signal. This addition further emphasizes the vertical outline of the image having the emphasized horizontal outline.

The image signal representing the image having the vertical outline emphasized by the vertical adder 97 is provided as an outline-corrected image signal to a circuit in a subsequent stage (not shown). In the image represented by the image signal in which the vertical outline is emphasized by the vertical adder 97, the horizontal outline is also emphasized, so that the outlines in the image are nonlinearly corrected so as to be greatly emphasized at the peripheral portions where resolution of a lens is low.

Resolution of an image captured by a camera becomes lower along directions from the center of a lens provided in the camera to the peripheral portions of the lens. For example, in the smallest concentric circle having the same center as that of the image, resolution is substantially at the same level in the entire area defined by the smallest concentric circle. This can be said of other larger concentric circles. However, in the larger concentric circles, resolution is substantially at the same level only in an area excluding the area defined by a smaller concentric circle(s). For example, in the second smallest concentric circle having the same center as that of the image, resolution is substantially at the same level in the entire area excluding the area defined by the smallest concentric circle. Therefore, in order to perform correction so as to achieve uniform resolution across the image, the amount of correction for the respective areas defined by the concentric circles having the same center as that of the image is required to be equal.

However, in the aforementioned conventional resolution correction apparatus 9, the vertical outline of the image is emphasized by the vertical variable amplifier 98 after the horizontal outline of the image is emphasized by the horizontal variable amplifier 94, and therefore the amount of correction is not equal in a concentric circle having the same center as that of the image. Therefore, there is a problem in that uniform resolution is not achieved across the image and the corrected image appears to be unnatural.

SUMMARY OF THE INVENTION

According to one aspect of the present invention, there is provided a resolution correction apparatus including: an outline signal generator for generating an outline signal, which represents an outline of an image, based on an image signal; an outline correction signal generator for generating an outline correction signal to emphasize the outline of the image, based on the outline signal generated by the outline signal generator and an amount of correction which is increased along radial directions from the center of the image to peripheral portions thereof; and an outline correction signal adder for adding the outline correction signal generated by the outline correction signal generator to the image signal.

In one embodiment of the invention, the resolution correction apparatus further includes a correction amount storage circuit for storing the amount of correction which is increased along the radial directions from the center of the image to the peripheral portions thereof, the outline correction signal generator generating the outline correction signal based on the outline signal and the amount of correction stored in the correction amount storage circuit.

In one embodiment of the invention, the correction amount storage circuit stores the amount of correction associated with a distance from a central position of the image, the apparatus further comprising a correction amount readout circuit for reading the correction amount stored in the correction amount storage circuit based on the distance from the central position of the image and providing the read correction amount to the outline correction signal generator.

In one embodiment of the invention, the resolution correction apparatus further includes: a correction function storage circuit for storing a function defining a relationship between the amount of correction and the distance from the central position of the image, and a correction amount calculation circuit for calculating the amount of correction based on the function and the distance from the central position of the image and providing the amount of correction to the outline correction signal generator.

According to another aspect of the present invention, there is provided a resolution correction program for allowing a computer to execute the steps of: a) generating an outline signal representing an outline of an image based on an image signal; b) generating an outline correction signal for emphasizing the outline of the image based on the outline signal generated in step a) and an amount of correction which is increased along radial directions from a center of the image to peripheral portions thereof; and c) adding the outline correction signal generated in step b) to the image signal.

According to still another aspect of the present invention, there is provided a computer-readable recording medium having the resolution correction program of the second aspect.

Thus, the invention described herein makes possible the advantages of providing: (1) a resolution correction apparatus and program capable of correcting an image captured by a camera so as to have uniform resolution thereacross, and a computer-readable recording medium having the same program recorded thereon; and (2) a resolution correction apparatus and program capable of correcting an image captured by a camera such that the correction amount is equal in a concentric circle having the same center as that of the image, and a computer-readable recording medium having the same program recorded thereon.

These and other advantages of the present invention will become apparent to those skilled in the art upon reading and understanding the following detailed description with reference to the accompanying figures.

BRIEF DESCRIPTION OF THE DRAWINGS

FIG. 5 is a diagram for explaining a correction amount table stored in a correction amount storage circuit provided in the resolution correction apparatus of FIG. 1.

DESCRIPTION OF THE PREFERRED EMBODIMENTS

Figure 1:
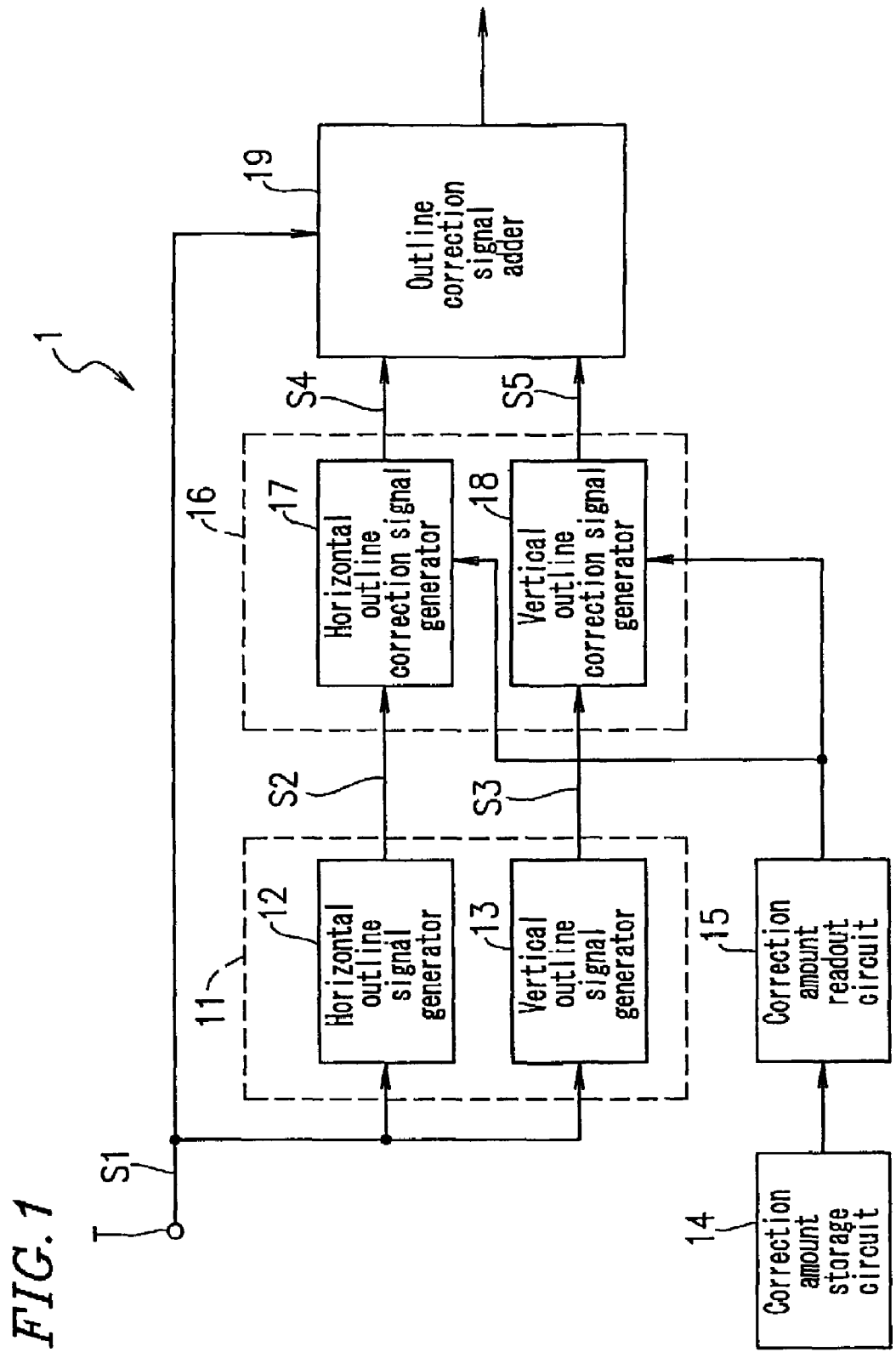
FIG. 1 is a block diagram of a resolution correction apparatus according to an embodiment of the present invention.

FIG. 1 is a block diagram of a resolution correction apparatus 1 according to an embodiment of the present invention. The resolution correction apparatus 1 corrects resolution of an image captured by a solid-state imaging element such as a CCD or CMOS sensor. The resolution correction apparatus 1 includes an input terminal T. The input terminal T receives an image signal S1 representing the image captured by the solid-state imaging element such as a CCD or CMOS sensor. The image signal S1 input to the input terminal T is supplied to a horizontal outline signal generator 12 and a vertical outline signal generator 13, which are provided in an outline signal generator 11, and an outline correction signal adder 19.

The horizontal outline signal generator 12 generates a horizontal outline signal S2 by extracting a horizontal outline component from the image signal S1 and outputs the horizontal outline signal S2 to a horizontal outline correction signal generator 17 provided in the outline correction signal generator 16.

Figure 2:
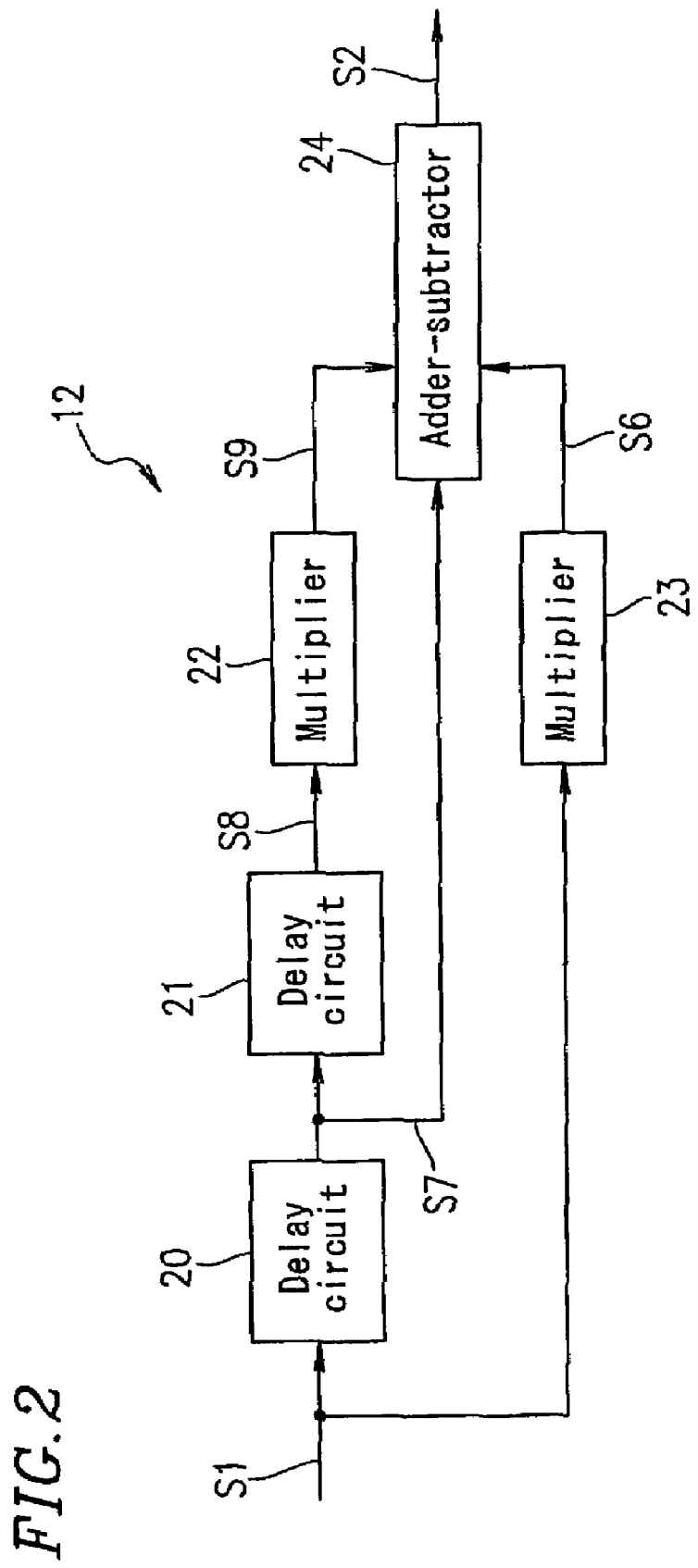
FIG. 2 is a block diagram of a horizontal outline signal generator provided in the resolution correction apparatus of FIG. 1.
Figure 3:
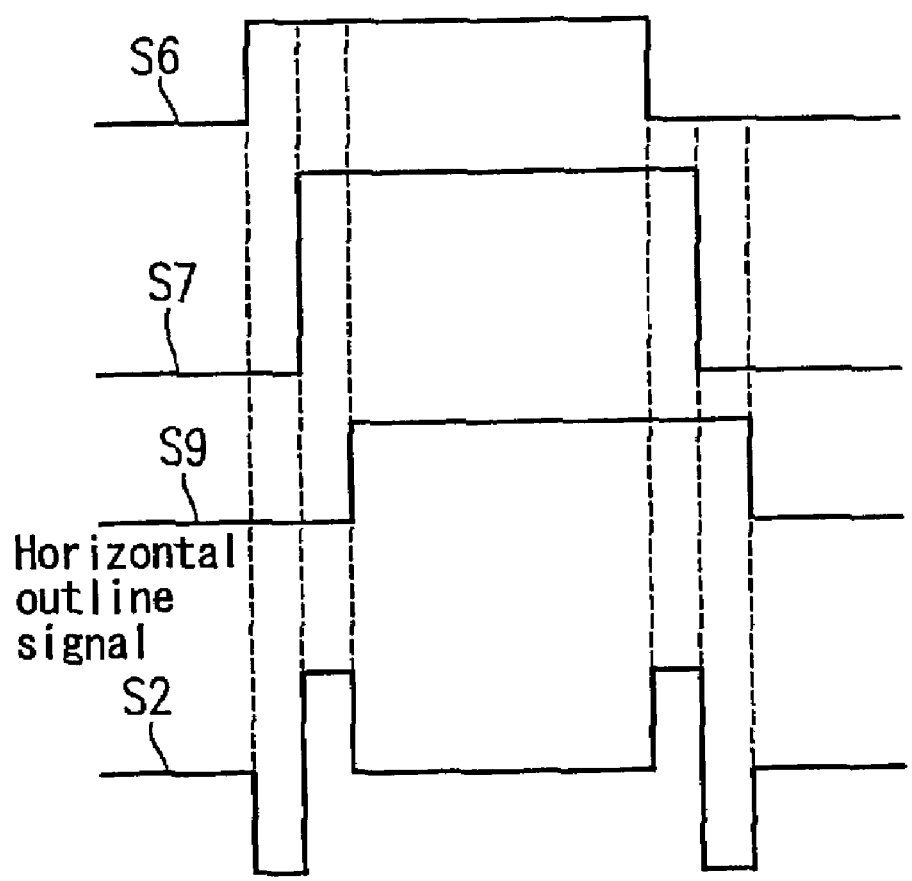
FIG. 3 is a timing chart of the horizontal outline signal generator provided in the resolution correction apparatus of FIG. 1.

FIG. 2 is a block diagram of the horizontal outline signal generator 12, and FIG. 3 is a timing chart of the horizontal outline signal generator 12.

Referring to FIG. 2, the image signal S1 input to the input terminal T is supplied to a delay circuit 20 and a multiplier 23. The multiplier 23 generates a signal S6 by halving the image signal S1 input to the input terminal T and outputs the resultant signal to an adder-subtractor 24. The delay circuit 20 generates a signal S7 by delaying the image signal S1 input to the input terminal T for a time period corresponding to a value of one pixel in the horizontal direction and outputs the signal S7 to the delay circuit 21 and the adder-subtractor 24. The delay circuit 21 generates a signal S8 by further delaying the signal S7, which is generated by the delay circuit 20 delaying the image signal S1 for a time period corresponding to a value of one pixel in the horizontal direction, for a time period corresponding to a value of one pixel in the horizontal direction and outputs the signal S8 to the multiplier 22. The multiplier 22 generates a signal S9 by halving the signal S8 generated by the delay circuit 21 and outputs the signal S9 to the adder-subtractor 24.

The adder-subtractor 24 subtracts the signal S6 generated by the multiplier 23 and the signal S9 generated by the multiplier 22 from the signal S7 generated by the delay circuit 20 to generate a horizontal outline signal S2 which is a horizontal outline component extracted from the signal S7.

Referring to FIG. 1, the vertical outline signal generator 13 receives the image signal S1 from the input terminal T and generates a vertical outline signal S3 by extracting a vertical outline component from the image signal S1. The vertical outline signal S3 is output to a vertical outline correction signal generator 18.

Figure 4:
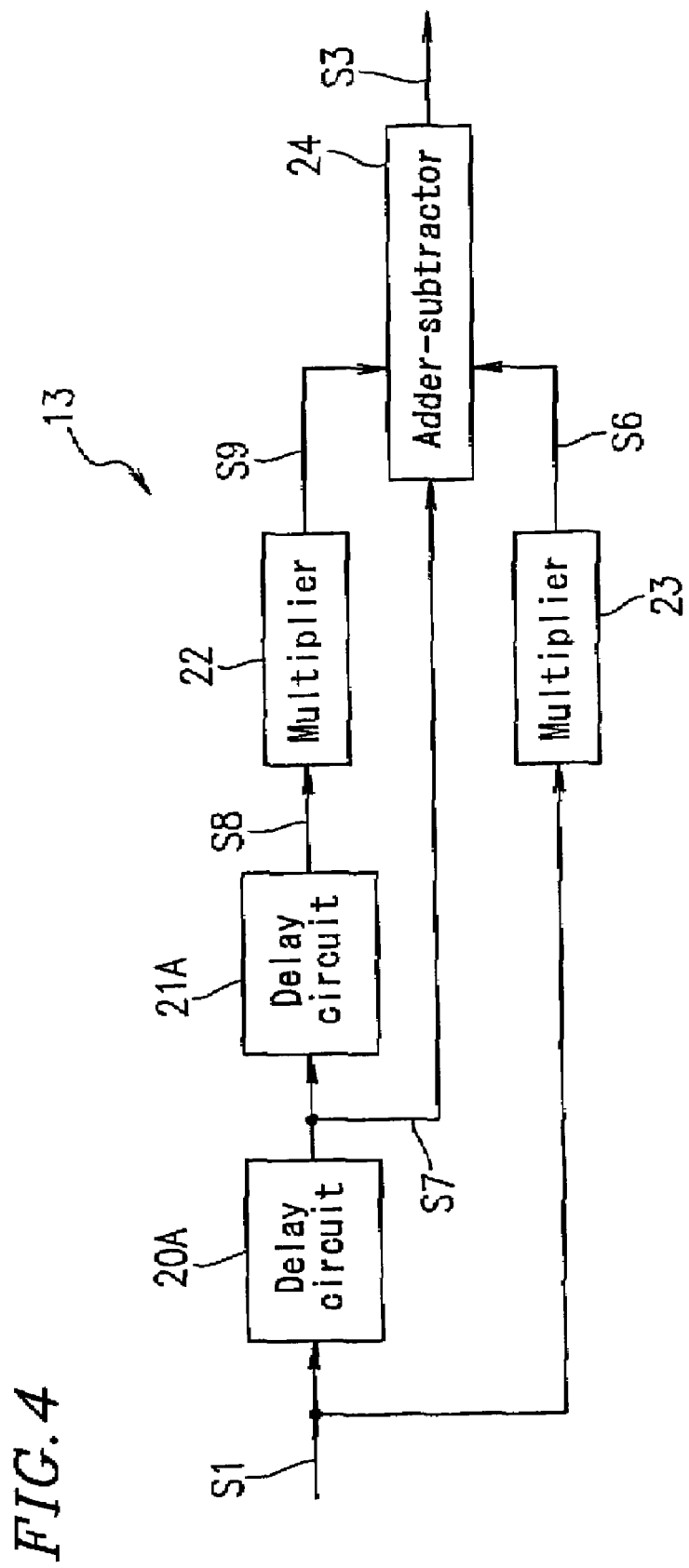
FIG. 4 is a block diagram of a vertical outline signal generator provided in the resolution correction apparatus of FIG. 1.

FIG. 4 is a block diagram of the vertical outline signal generator 13. In FIG. 4, the same elements as those of the horizontal outline signal generator 12 shown in FIG. 2 are denoted by the same reference numerals, and the description thereof will be omitted. In the vertical outline signal generator 13, delay circuits 20A and 21A each delaying a signal input thereto for a value corresponding to one horizontal line are provided in place of the delay circuits 20 and 21 each delaying a signal input thereto for a value corresponding to one pixel. With this structure, the vertical outline signal S3 is generated by extracting a vertical outline component from the input signal in a similar manner as in the horizontal outline signal circuit 12.

Referring to FIG. 1, the resolution correction apparatus 1 includes a correction amount storage circuit 14. The correction amount storage circuit 14 stores the amount of correction which is increased along radial directions from the center of an image captured by a solid-state imaging element to the peripheral portions of the image.

Figure 5:
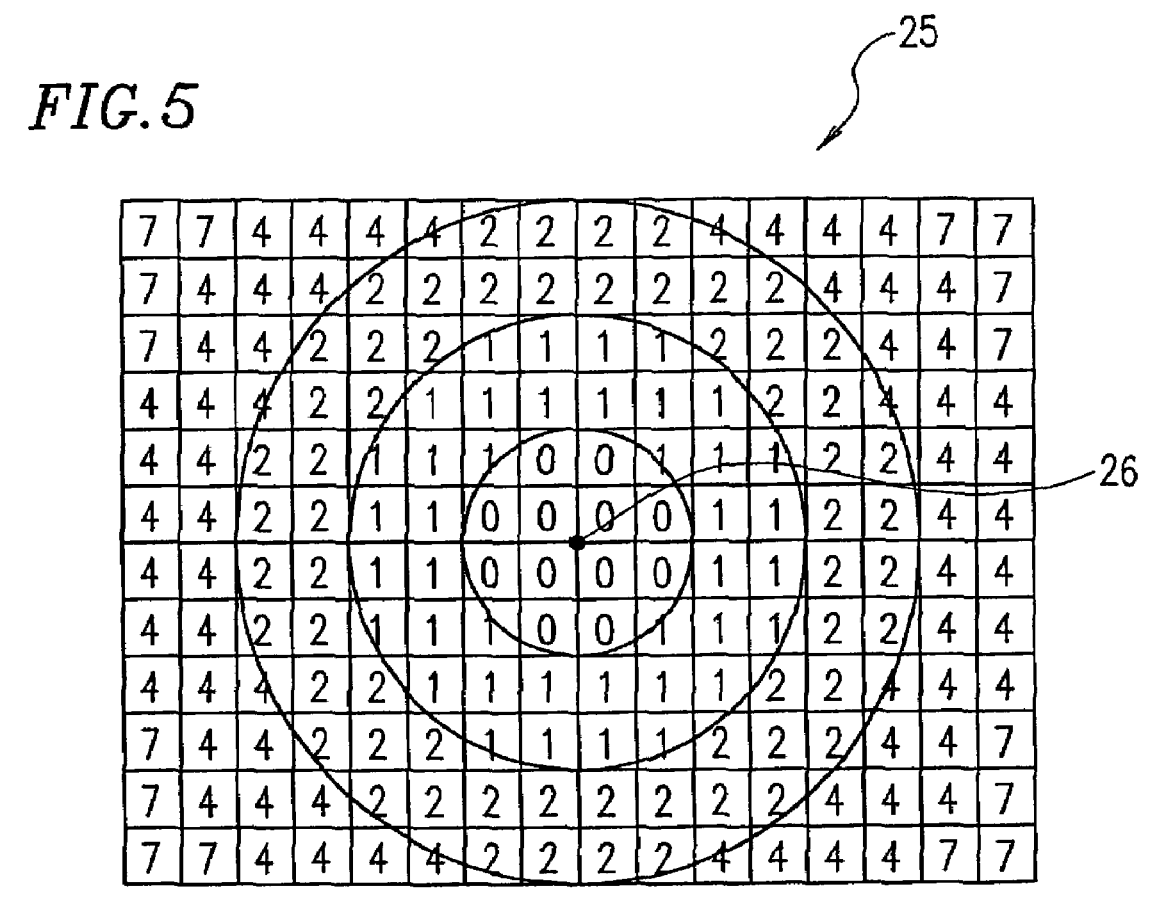

FIG. 5 is a diagram for explaining a correction amount table 25 stored in the correction amount storage circuit 14. The correction amount table 25 is provided in the form of a matrix such that positions in the matrix correspond to pixels included in an image captured by a solid-state imaging element. In each position corresponding to one of the pixels included in the image, the amount of correction for the corresponding one of the pixels is stored. The amount of correction stored at positions within the innermost concentric circle having the same center as a center 26 of the image is 0. The amount of correction stored at positions outside the innermost concentric circle and within the second concentric circle from the center is greater than 0, and the amount is 1. The amount of correction stored at positions outside the second concentric circle from the center and within the outermost concentric circle is greater than 1, and the amount is 2. The amount of correction stored at the positions outside the outermost concentric circle in the correction amount table 25 is greater than 2, and the amount is 4, except for at positions in four corner portions of the correction amount table 25. The amount of correction stored in the four corner portions of the correction amount table 25 is greater than 4 and is equal to 7.

As described above, the amount of correction stored in the correction amount storage circuit 14 is increased along the radial directions from the center 26 of the image to the peripheral portions thereof.

Referring to FIG. 1, the resolution correction apparatus 1 includes a correction amount readout circuit 15. The correction amount readout circuit 15 reads the amount of correction for pixels targeted for correction from the correction amount storage circuit 14 on a pixel-by-pixel basis.

The horizontal outline correction signal generator 17 multiplies the horizontal outline signal S2 generated by the horizontal outline signal generator 12 by the amount of correction, which is increased along the radial directions from the image center 26 to the peripheral portions of the image, for each pixel to generate a horizontal outline correction signal S4, and outputs the horizontal outline correction signal S4 to the outline correction signal adder 19. The vertical outline correction signal generator 18 multiplies the vertical outline signal S3 generated by the vertical outline signal generator 13 by the amount of correction, which is increased along the radial directions from the image center 26 to the peripheral portions of the image, for each pixel to generate a vertical outline correction signal S5, and outputs the vertical outline correction signal S5 to the outline correction signal adder 19.

The outline correction signal adder 19 adds to the image signal S1 input to the input terminal T the horizontal outline correction signal S4 generated by the horizontal outline correction signal generator 17 and the vertical outline correction signal S5 generated by the vertical outline correction signal generator 18.

Figure 6:
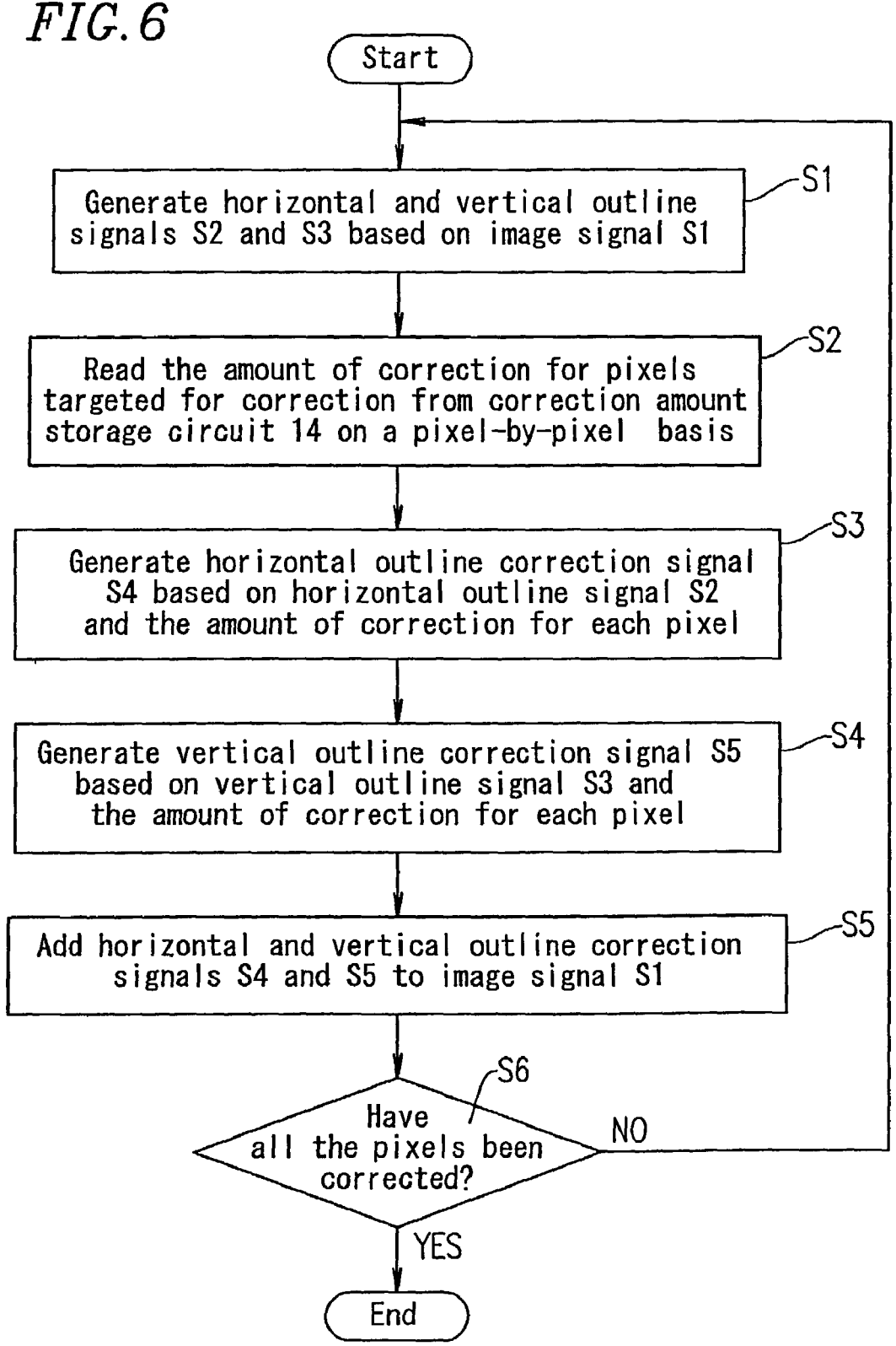
FIG. 6 is a flowchart showing a resolution correction method according to an embodiment of the present invention.

FIG. 6 is a flowchart showing a resolution correction method according to an embodiment of the present invention. In the resolution correction apparatus 1 having the above structure, when the image signal S1 is input to the input terminal T, the horizontal outline signal generator 12 generates the horizontal outline signal S2 based on the image signal S1. The vertical outline signal generator 13 generates the vertical outline signal S3 based on the image signal S1 (step S1).

The correction amount readout circuit 15 reads the amount of correction, which is increased along the radial directions from the image center 26 to the peripheral portions of the image, from the correction amount storage circuit 14 on a pixel-by-pixel basis (step S2). The horizontal outline correction signal generator 17 multiplies the horizontal outline signal S2 generated by the horizontal outline signal generator 12 by the amount of correction, which is increased along the radial directions from the image center 26 to the peripheral portions of the image and is read by the correction amount readout circuit 15, for each pixel to generate the horizontal outline correction signal S4 (step S3). The vertical outline correction signal generator 18 multiplies the vertical outline signal S3 generated by the vertical outline signal generator 13 by the amount of correction, which is increased along the radial directions from the image center 26 to the peripheral portions of the image and is read by the correction amount readout circuit 15, for each pixel to generate the vertical outline correction signal S5 (step S4). The outline correction signal adder 19 adds to the image signal S1 input to the input terminal T the horizontal outline correction signal S4 generated by the horizontal outline correction signal generator 17 and the vertical outline correction signal S5 generated by the vertical outline correction signal generator 18 (step S5). Whether or not correction for all the pixels included in the image are performed is determined (step S6). When it is determined that the correction is not performed on all the pixels included in the image ("NO" in step S6), the procedure returns to step S1. Alternatively, when it is determined that the correction is performed on all the pixels included in the image ("YES" in step S6), the resolution correction method is ended.

The resolution correction method described with reference to FIG. 6 can be performed by a resolution correction program which is a computer program.

Figure 7:
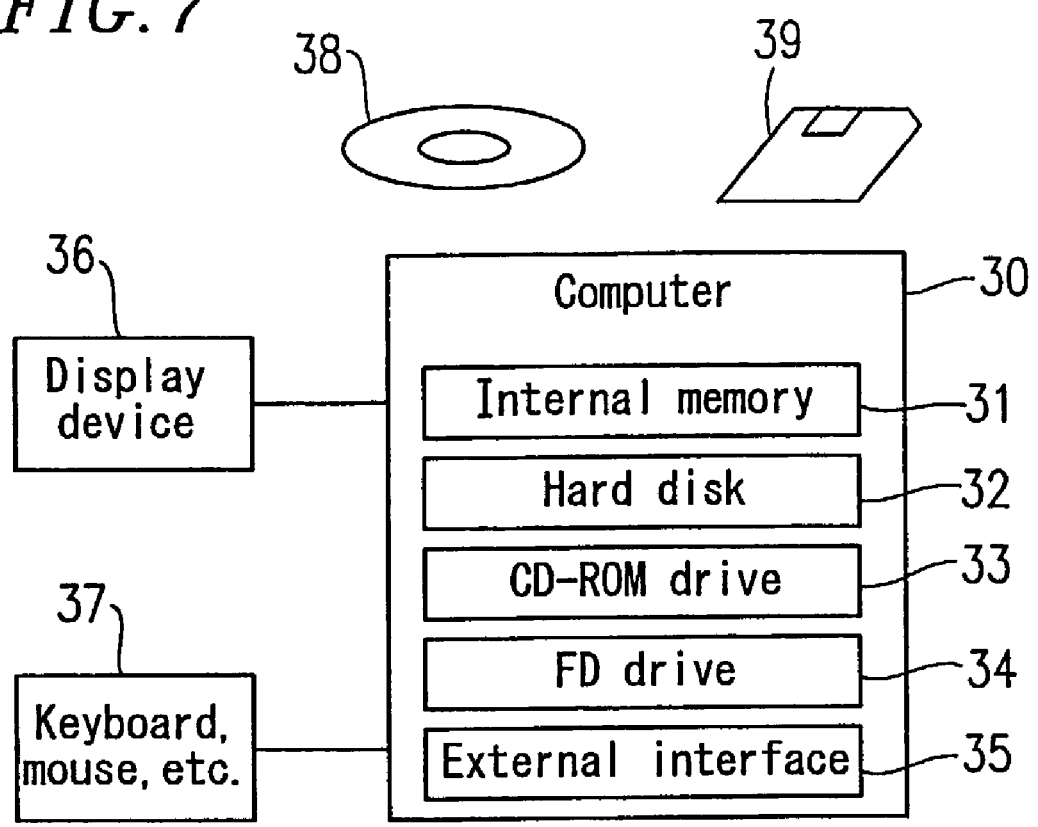
FIG. 7 is a diagram for explaining a computer and a computer-readable recording medium according to an embodiment of the present invention having a resolution correction program recorded thereon.

FIG. 7 is a diagram for explaining a computer and a computer-readable recording medium having the resolution correction program recorded thereon. In FIG. 7, a computer 30 includes a CD-ROM drive 33. The CD-ROM drive 33 receives a CD-ROM 38 having a resolution correction program recorded thereon. The computer 30 also includes an FD (floppy disk) drive 34. The FD drive 34 receives an FD 39.

The computer 30 also includes a hard disk 32. The resolution correction program read by the computer 30 from the CD-ROM 38 inserted into the CD-ROM drive 33 is installed in the hard disk 32. The computer 30 also includes an internal memory 31. The resolution correction program installed in the hard disk 32 is read by the internal memory 31. The computer 30 also includes an external interface 35. The external interface 35 receives an image signal representing an image resolution of which is corrected by the resolution correction program. The computer 30 also includes a display device 36 and an input section 37 including a keyboard, a mouse, etc.

When the CD-ROM 38 having the resolution correction program recorded thereon is inserted into the CD-ROM drive 33, the computer 30 installs the resolution correction program recorded on the CD-ROM 38 into the hard disk 32. The computer 30 reads the resolution correction program, which is installed in the hard disk 32, into the internal memory 31 and executes the resolution correction program. When the image signal is input to the external interface 35, the resolution correction program corrects resolution of the image represented by the image signal input to the external interface 35.

The resolution correction program recorded on the FD disk 39 inserted into the FD drive 34 may be installed in the hard disk 32. In order for resolution of an image represented by an image signal to be corrected by the resolution correction program, the image signal may be recorded on the CD-ROM 38 or the FD 39 and input to the computer 30 via the CD-ROM drive 33 or the FD drive 34.

As described above, according to the present invention, the horizontal and vertical outline correction signals S4 and S5 are generated by multiplying the amount of correction, which is increased along the radial directions from the image center 26 to the peripheral portions of the image, with the horizontal and vertical outline signals S2 and S3, respectively. The horizontal and vertical outline correction signals S4 and S5 are added to the image signal S1. This allows the resolution of the image, which becomes lower along the radial directions from the image center to the peripheral portions of the image, to be corrected with high precision, thereby obtaining an image having uniform resolution thereacross.

Figure 8:
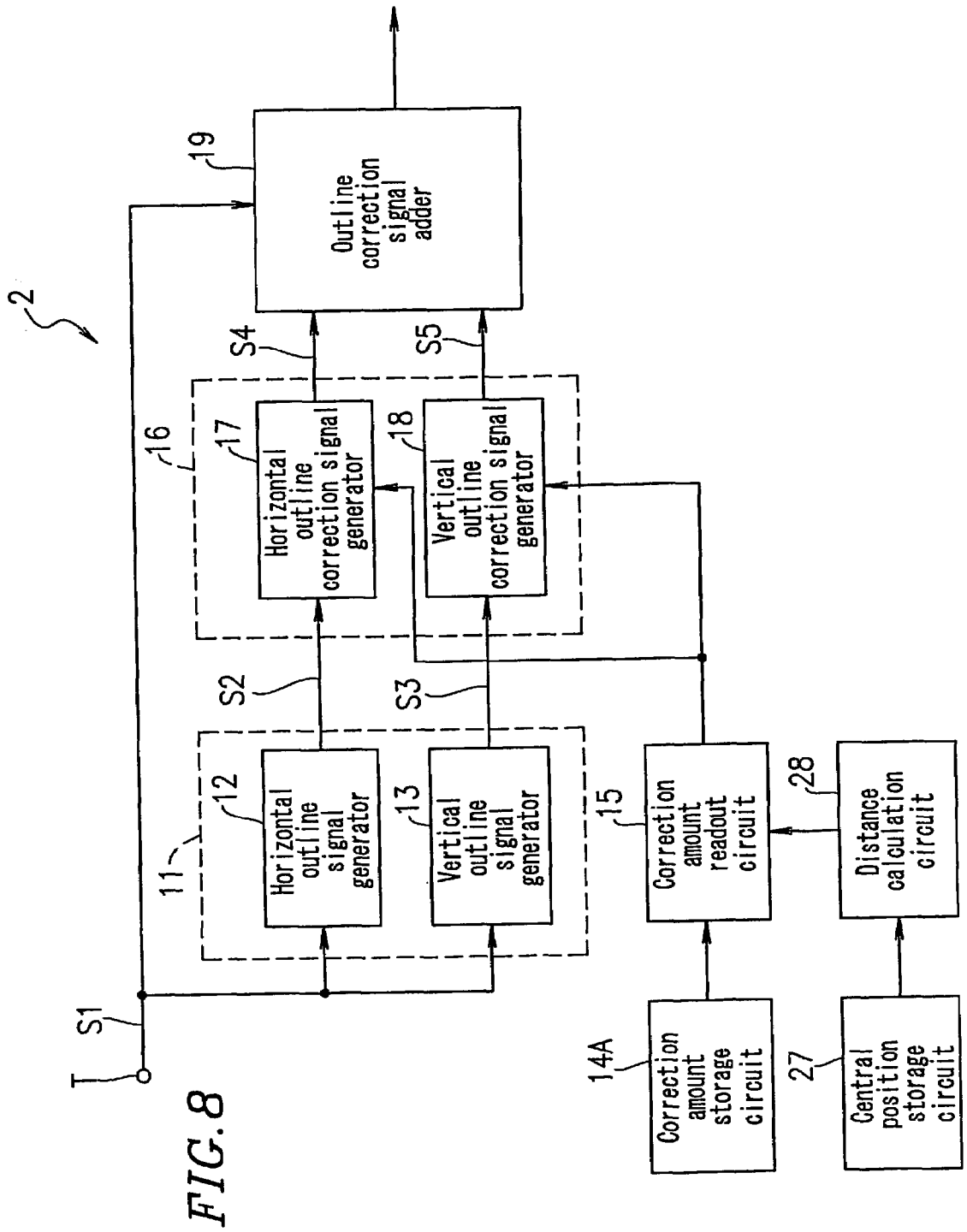
FIG. 8 is a resolution correction apparatus according to another embodiment of the present invention.

FIG. 8 is a block diagram of a resolution correction apparatus 2 according to another embodiment of the present invention. In FIG. 8, the same elements as those of the resolution correction apparatus 1 described above with reference to FIG. 1 are denoted by the same reference numerals, and the description thereof will be omitted. The resolution correction apparatus 2 differs from the resolution correction apparatus 1 in that a central position storage circuit 27 and a distance calculation circuit 28 are further included and a correction amount storage circuit 14A is provided in place of the correction amount storage circuit 14.

The central position storage circuit 27 stores a central position of an image captured by a solid-state imaging element. The distance calculating circuit 28 calculates a distance between the central position of the image stored in the central position storage circuit 27 and a pixel targeted for resolution correction. The correction amount storage circuit 14A stores a table defining the relationship between the amount of correction and the distance from the central position of the image.

When the distance calculation circuit 28 calculates the distance between the central position of the image stored in the central position storage circuit 27 and the pixel targeted for resolution correction, the correction amount readout circuit 15 reads the amount of correction from the correction amount storage circuit 14A based on the distance between the central position of the image and the pixel targeted for resolution correction, which is calculated by the distance calculation circuit 28.

As described above, the correction amount storage circuit 14A stores the table defining the relationship between the amount of correction and the distance from the central position of the image, and therefore it is possible to reduce storage capacity as compared to the correction amount storage circuit 14 which stores the correction amount table 25 in which the amount of correction for each pixel included in the image is stored in a corresponding position.

Figure 9:
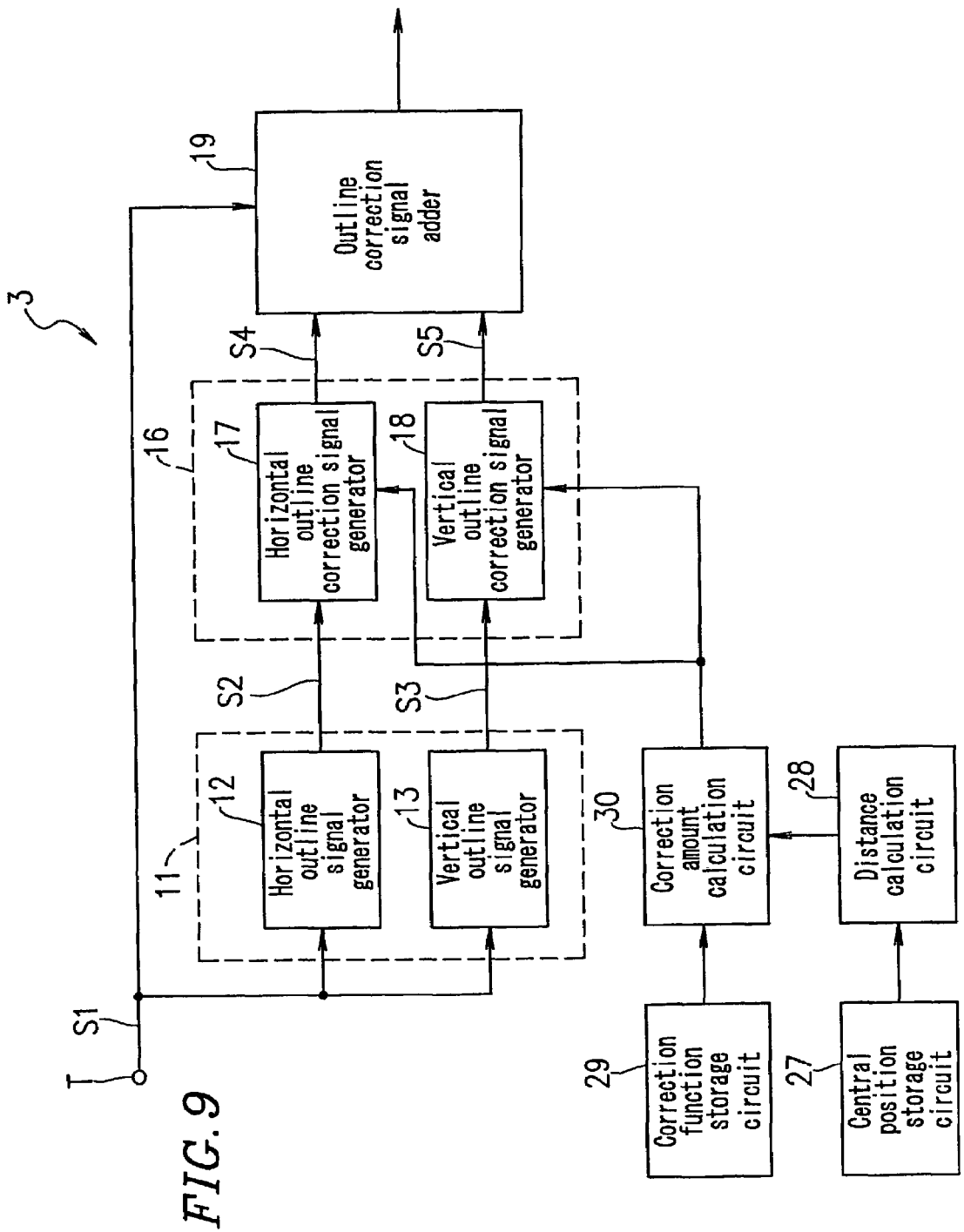
FIG. 9 is a resolution correction apparatus according to still another embodiment of the present invention.
Figure 10:
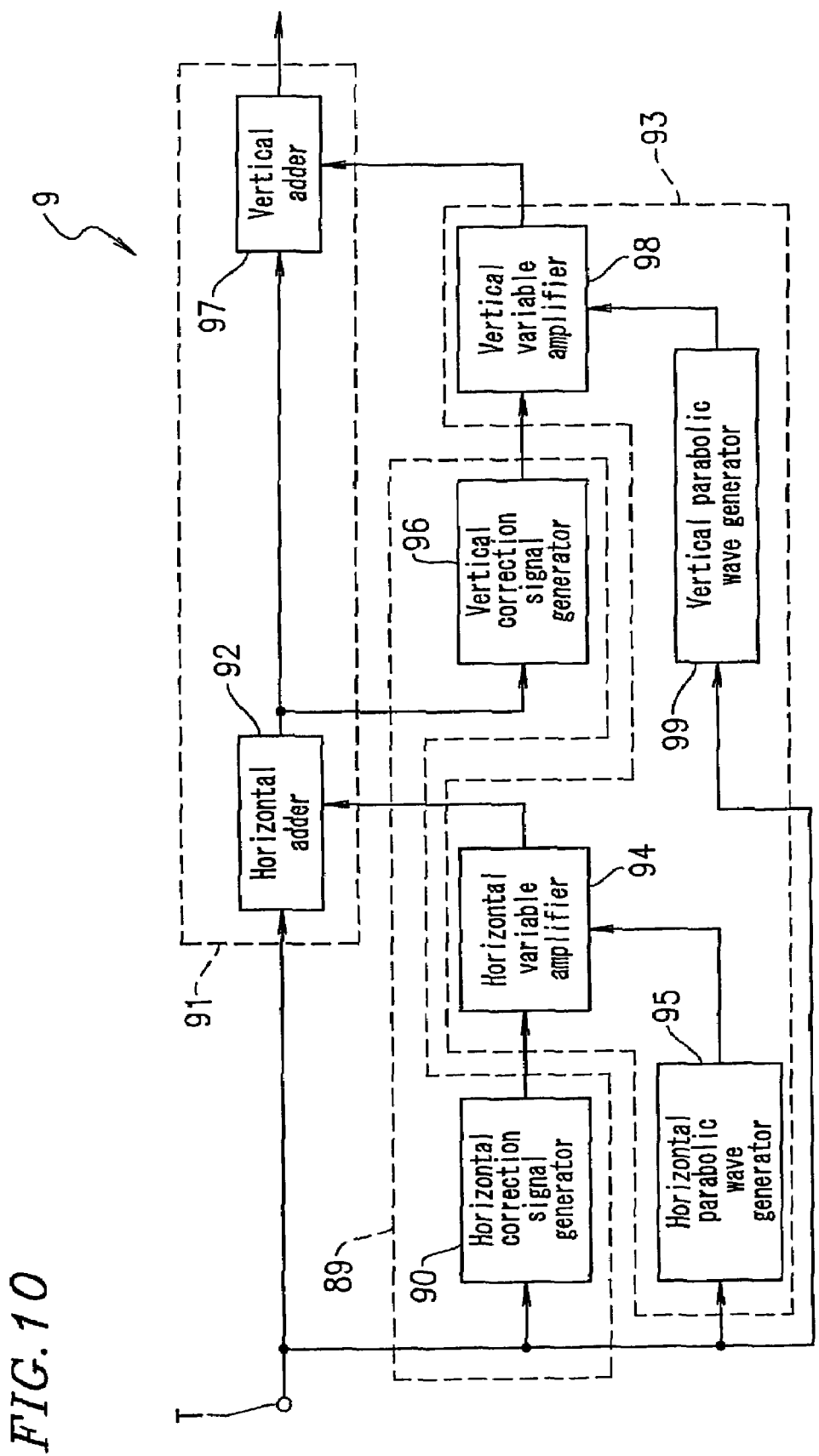
FIG. 10 is a block diagram of a conventional resolution correction apparatus.

FIG. 9 is a block diagram of a resolution correction apparatus 3 according to still another embodiment of the present invention. In FIG. 9, the same elements as those of the resolution correction apparatus 2 described above with reference to FIG. 8 are denoted by the same reference numerals, and the description thereof will be omitted. The resolution correction apparatus 3 differs from the resolution correction apparatus 2 in that a correction function storage circuit 29 is provided in place of the correction amount storage circuit 14A and a correction amount calculation circuit 30 is provided in place of the correction amount readout circuit 15.

The correction function storage circuit 29 stores a function defining the relationship between the amount of correction and a distance from the central position of an image to pixels targeted for resolution correction. This function is represented by, for example, an approximating polynomial. The correction amount calculation circuit 30 calculates the amount of correction by assigning the distance between the central position of the image and a pixel targeted for resolution correction, which is calculated by the distance calculation circuit 28, into the function stored in the correction function storage circuit 29.

In this manner, the correction function storage circuit 29 stores the function defining the relationship between the amount of correction and the distance from the central position of the image, and therefore a storage circuit for storing the amount of correction, such as the correction amount storage circuit 14 or 14A, is not required.

As described above, the present invention provides a resolution correction apparatus and resolution correction program capable of correcting an image captured by a camera so as to be an image having uniform resolution thereacross, and a computer-readable recording medium having the resolution correction program recorded thereon.

Further, the present invention provides a resolution correction apparatus and resolution correction program capable of correcting an image captured by a camera such that the correction amount is equal in a concentric circle having the same center as that of the image, and a computer-readable recording medium having the same program recorded thereon.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A resolution correction apparatus comprising:
   an outline signal generator for generating an outline signal, which represents an outline of an image, based on an image signal;
   an outline correction signal generator for generating an outline correction signal to emphasize the outline of the image, based on the outline signal generated by the outline signal generator and an amount of resolution correction which is increased along radial directions from the center of the image to peripheral portions thereof; and
   an outline correction signal adder for adding the outline correction signal generated by the outline correction signal generator to the image signal, wherein
   the amount of resolution correction preformed is equal for respective areas of the image defined by concentric circles having a common center as that of the image so that there is uniform resolution across the image.

2. A resolution correction apparatus comprising:
   an outline signal generator for generating an outline signal, which represents an outline of an image, based on an image signal;
   an outline correction signal generator for generating an outline correction signal to emphasize the outline of the image, based on the outline signal generated by the outline signal generator and an amount of correction which is increased along radial directions from the center of the image to peripheral portions thereof;
   an outline correction signal adder for adding the outline correction signal generated by the outline correction signal generator to the image signal; and
   a correction amount storage circuit for storing the amount of correction which is increased along the radial directions from the center of the image to the peripheral portions thereof, wherein
   the outline correction signal generator generates the outline correction signal based on the outline signal and the amount of correction stored in the correction amount storage circuit.

3. The resolution correction apparatus according to claim 2, wherein
   the correction amount storage circuit stores the amount of correction associated with a distance from a central position of the image, the apparatus further comprising a correction amount readout circuit for reading the correction amount stored in the correction amount storage circuit based on the distance from the central position of the image and providing the read correction amount to the outline correction signal generator.

4. A resolution correction apparatus comprising:
   an outline signal generator for generating an outline signal, which represents an outline of an image, based on an image signal;
   an outline correction signal generator for generating an outline correction signal to emphasize the outline of the image, based on the outline signal generated by the outline signal generator and an amount of correction which is increased along radial directions from the center of the image to peripheral portions thereof;
   an outline correction signal adder for adding the outline correction signal generated by the outline correction signal generator to the image signal;
   a correction function storage circuit for storing a function defining a relationship between the amount of correction and the distance from the central position of the image; and
   a correction amount calculation circuit for calculating the amount of correction based on the function and the distance from the central position of the image and providing the amount of correction to the outline correction signal generator.

5. A computer-readable recording medium having a resolution correction program for allowing a computer to execute the steps of:
   a) generating an outline signal representing an outline of an image based on an image signal;
   b) generating an outline correction signal for emphasizing the outline of the image based on the outline signal generated in step a) and an amount of resolution correction which is increased along radial directions from a center of the image to peripheral portions thereof; and
   c) adding the outline correction signal generated in step b) to the image signal, wherein
   the amount of resolution correction performed is equal for respective areas of the image defined by concentric circles having a common center as that of the image so that there is uniform resolution across the image.

* * * * *